United States Patent
Wong et al.

(10) Patent No.: US 11,314,202 B2
(45) Date of Patent: Apr. 26, 2022

(54) DISPLAYING CURRENT COLORANT SUPPLY STATUS INFORMATION RESPONSIVE TO OPENING OF PRINTING DEVICE DOOR

(71) Applicant: Hewlett-Packard Development Company, L.P., Spring, TX (US)

(72) Inventors: Howard G Wong, Vancouver, WA (US); Kris R. Livingston, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/293,159

(22) PCT Filed: Apr. 30, 2019

(86) PCT No.: PCT/US2019/029983
§ 371 (c)(1),
(2) Date: May 12, 2021

(87) PCT Pub. No.: WO2020/222816
PCT Pub. Date: Nov. 5, 2020

(65) Prior Publication Data
US 2022/0043390 A1 Feb. 10, 2022

(51) Int. Cl.
*G03G 15/00* (2006.01)
*G03G 21/18* (2006.01)
*G03G 21/16* (2006.01)

(52) U.S. Cl.
CPC ....... *G03G 21/1875* (2013.01); *G03G 15/502* (2013.01); *G03G 15/556* (2013.01); *G03G 21/1633* (2013.01); *G03G 21/1652* (2013.01)

(58) Field of Classification Search
CPC .............. G03G 15/502; G03G 15/556; G03G 21/1633; G03G 21/1652; G03G 21/1875; B41F 31/02; B41F 31/022; B41F 33/00; B41L 27/04
See application file for complete search history.

(56) References Cited

U.S. PATENT DOCUMENTS

| | | | |
|---|---|---|---|
| 6,229,975 B1 * | 5/2001 | Wilhelm | G03G 21/105 399/120 |
| 6,748,183 B2 | 6/2004 | Edmonds | |
| 7,314,271 B2 | 1/2008 | Fukano et al. | |
| 7,510,257 B2 | 3/2009 | Jung et al. | |
| 8,132,877 B2 | 3/2012 | Gold et al. | |
| 2002/0042747 A1 | 4/2002 | Istvan | |
| 2008/0181713 A1 | 7/2008 | Ogle et al. | |
| 2017/0279990 A1 | 9/2017 | Xu | |
| 2018/0124280 A1 | 5/2018 | Panshin et al. | |
| 2018/0157202 A1 * | 6/2018 | Watanabe | G03G 21/1633 |
| 2018/0194150 A1 | 7/2018 | Smith et al. | |

FOREIGN PATENT DOCUMENTS

EP 0945781 B1 8/2004
WO WO-2018186834 A1 10/2018

* cited by examiner

*Primary Examiner* — Sophia S Chen
(74) *Attorney, Agent, or Firm* — Michael Dryja (57) ABSTRACT

A printing device includes a door, a display, and a colorant supply. The printing device detects that the door has been opened. In response to detecting that the door has been opened, the printing device displays, on its display, current status information of the colorant supply within the printing device.

14 Claims, 7 Drawing Sheets

DISPLAYING CURRENT COLORANT SUPPLY STATUS INFORMATION RESPONSIVE TO OPENING OF PRINTING DEVICE DOOR

BACKGROUND

Printing devices include multifunction devices (MFDs) and all-in-one (AIO) printing devices that combine printing functionality with other functionality, such as scanning, copying, and faxing functionality. Printing devices also include standalone printers that have just printing functionality. Printing devices can use a variety of different technologies, including laser-printing, inkjet-printing technologies, and three-dimensional (3D) printing technologies. Entities, such as organizations like business enterprises, governments, and other organizations, may have a large number of different printing devices of different models from the same or different manufacturers, and that use the same or different printing technologies.

DETAILED DESCRIPTION

As noted in the background, entities may have a large number of different printing devices of different models from the same or different manufacturers, and that use the same or different printing technologies to form images on media like paper as well as to form three-dimensional (3D) structures. Entities may have one or more administrators who are responsible for ensuring that the printing devices remain stocked with consumable items, including media as well as colorant such as ink, toner, and 3D printing material like plastic, filament, and other 3D printing material. Larger entities may have administrators whose sole job is maintaining printing devices in this manner, other entities may have administrators who may maintain printing devices in addition to performing other duties. Still other entities, like smaller entities, may rely upon service providers whose personnel periodically visit client entities to maintain their printing devices.

When an administrator visits a particular location to maintain the printing devices at that location, the administrator may go printing device to printing device to determine whether the colorant supplies of the printing devices have to be replenished. Whether a given printing device's colorant supplies have to be replenished may not be easily ascertained. Many printing devices have displays, such as touchscreen displays, that can show the current supply levels of their colorant supplies. However, this information is often not always displayed on the printing devices or in a manner that is not quickly and easily discernible.

An administrator may thus have to interact with a user interface provided by the display of a printing device, in conjunction with an input mechanism of the device—such as on the device's display itself in the case of a touchscreen, or by using separate buttons—to view this information. Different printing devices from different manufacturers, and even different models of printing devices from the same manufacturers, usually have different user interfaces that each have different steps that an administrator has to perform to view the current colorant supply levels. The user interface menu item to select to display this information may be buried within a hierarchy of user interface menus, and navigating to the relevant menu item may not be intuitive.

The end result is that an administrator may waste an inordinate amount of time at a printing device to determine if a colorant supply of the printing device is low or empty and thus should be replenished. To assist the administrator in identifying such printing devices needing colorant supply replenishment, networkable printing devices may be able to be configured so that when their colorant supplies are running low or become empty, notifications or alerts are sent over a network in the form of text messages or emails, or in another manner. However, the printing devices may not be configured correctly in this respect, the recipient of these notifications or alerts may not be the administrator who is ultimately responsible for replenishing the colorant supplies in the field, or the administrator may not otherwise receive these notifications or alerts.

Techniques described herein ameliorate these difficulties. When the door of a printing device is opened, the printing device responsively displays on its display current status information of a colorant supply of a colorant supply within the printing device, such as the current supply level and the current quality level of the colorant supply. If the printing device has more than one colorant supply, as is often encountered with color printing devices that have separately replenishable colorant supplies such as cyan, magenta, yellow, and black colorant supplies, the current status information of each colorant supply is displayed when the printing device's door is opened. The colorant supply level of a colorant supply can be displayed, for instance, regardless of whether the colorant supply is empty or low and thus should be replenished immediately or soon, or whether the colorant supply level is sufficiently high that replenishment is unnecessary or will likely not be necessary in the immediate future. The terminology "colorant" as used herein encompasses colorant like ink and toner, as well as printing materials such as 3D printing materials.

An administrator responsible for maintaining a large number of diverse printing devices of different models, manufacturers, and so on, thus can proceed from printing device to printing device and quickly determine whether the colorant supply at each device should be replenished. The administrator or other user does not have to interact with the user interface of a printing device to cause the device to display the current colorant supply level or other current status information regarding the colorant supply, but simply has to open the printing device's door. If the printing device is in a low-power mode, such as a sleep or other mode, or the printing device's display is otherwise currently off, opening the door causes the printing device to wake if necessary and turn on its display to show this information.

Besides displaying the current supply level or other current status information of each of its colorant supplies in response to its door being opened, a printing device may also separately identify those colorant supplies having a current status that may require immediate replenishment or replenishment in the near future. For example, an exclamation mark or other visual identifier may be displayed along with the current supply level of each colorant supply that is low and that should be replenished now or in the near future. Each colorant supply that is empty may be identified in another way, such as with a red X crossing out the colorant supply in question, or in another manner. Such cues also aid the administrator in identifying the colorant supplies of a printing device that the administrator should replenish.

When its door is opened, the printing device can further display information identifying a compatible replenishment colorant supply for each colorant supply of the device. For example, in the case of laser-printing devices and some types of inkjet-printing devices, each colorant supply may be a replaceable toner cartridge or ink cartridge or tank, and the part number of each such replacement colorant supply may be displayed on the printing device's display when the device's door is opened. As another example, in the case of an inkjet-printing device having colorant supplies that are each refillable with a corresponding external ink supply, the part number of each refillable supply may be identified. In addition to or in lieu of the part number of a compatible replenishment colorant supply, a machine-scannable code, such as a bar code or a QR code, may be displayed, and/or ordering information for this compatible supply may be displayed.

The printing device may display all of this information just when the particular door of the printing device that enables the device's colorant supplies to be replenished is opened, and not responsive to the opening of any other door of the printing device. A printing device may have a number of doors, some of which are opened just to gain access to an internal printing path of the device, for instance, whereas others are opened to stock the printing device with other consumable items, such as media like paper. By displaying the current status information of each colorant supply just in response to the specific door of the printing device that enables the administrator to replenish each colorant supply, the administrator thus can know that he or she has opened the correct door in this respect.

For example, in the case of a laser-printing device, there may be a door that is opened to permit removal of the current toner cartridges with replacement toner cartridges. The same may be true for some types of inkjet-printing devices and some types of 3D-printing devices. The appropriate door of a printing device in this respect covers the currently installed cartridges or tanks. For some types of inkjet-printing devices, opening the appropriate door may result in the printing device moving the inkjet cartridges along a carriage so that they are visible and can be replaced. As another example, in the case of other types of inkjet-printing devices that employ refillable internal reservoirs as their colorant supplies, the relevant doors may just reveal ports to which external ink supplies are fluidically connected to refill the reservoirs.

Administrators may be unfamiliar with these latter types of inkjet-printing devices in particular, as they are newer than other types of printing devices and currently encountered less frequently in the field than other types of printing devices. Therefore, an administrator may open the correct door of such a printing device by which the device's colorant supplies are replenishable, but fail to recognize this fact, because the administrator is expecting to see removable and replaceable cartridges and not ports by which internal (and not directly visible) reservoirs are refilled. As such, by displaying the current colorant supply levels and/or other current status information regarding the colorant supplies just when the doors covering these ports are opened, the printing devices serve to indicate to the administrators or other users that the correct doors have indeed been opened in this respect.

A printing device can display other information as well responsive to its door being opened. For example, the printing device may show instructions as to how to replenish the device's colorant supplies, in the form of a series of one or more images, or in the form of a brief animation. If the administrator is unfamiliar with how to, for instance, remove a currently installed toner or ink cartridge or tank and insert a replacement cartridge or tank, this information may mean that the administrator does not have to resort to looking up these instructions in a service or other manual for the printing device.

Furthermore, and in this respect, an administrator may be unfamiliar with how to replenish the refillable ink reservoirs of a printing device that employs such colorant supplies. Some types of such printing devices just require users to pour ink into corresponding ports, whereas other types of refillable printing devices have users connect tubing to such ports to refill the reservoirs. Still other such printing devices are more technologically advanced, and use external cartridges with special connectors that mate with the devices' ports so that the internal ink reservoirs can be refilled in a way that prevents overfilling and spillage and that ensures subsequent optimal printing performance and quality.

Figure 1:
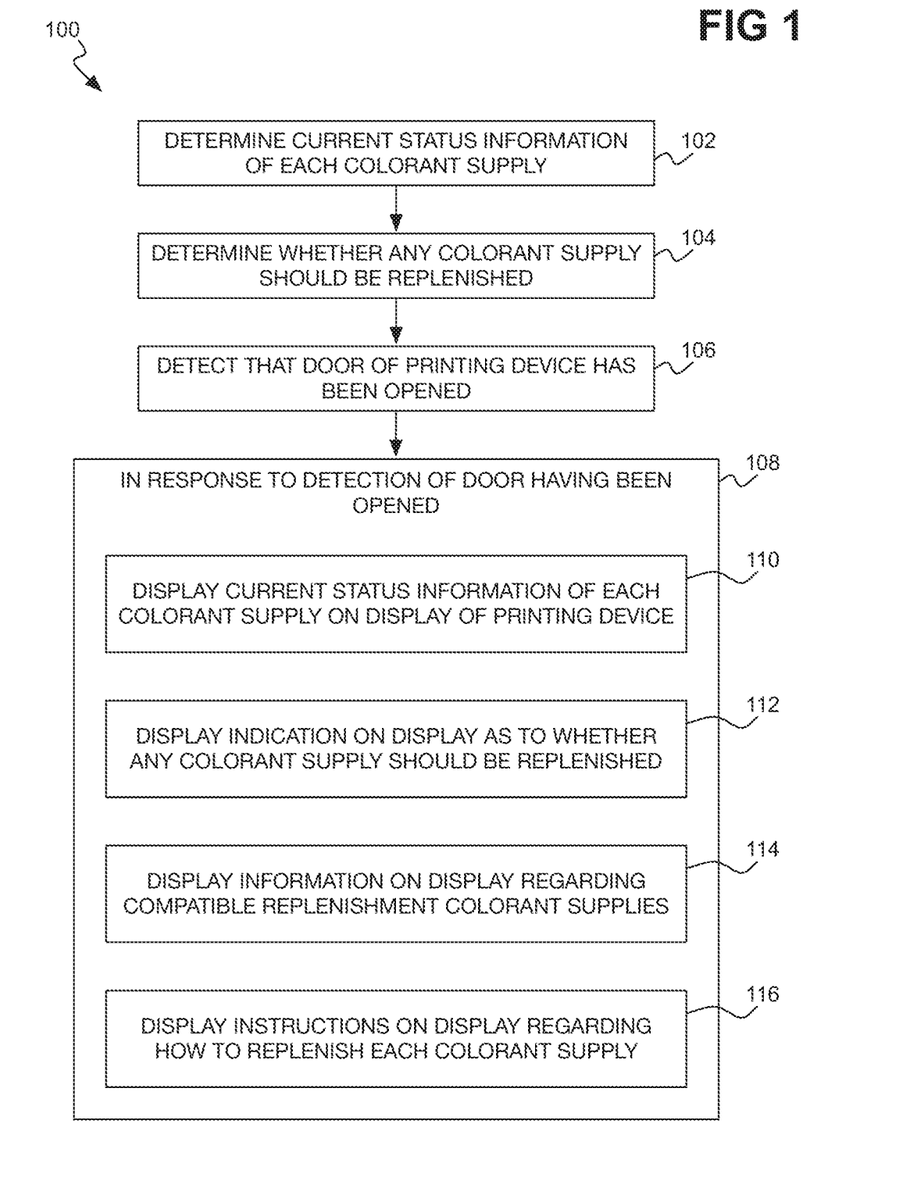
FIG. 1 is a flowchart of an example method for displaying on a display of a printing device the status information of each colorant supply within the device in response to opening of a door of the device.

FIG. 1 shows an example method 100 for displaying the current status information of each colorant supply of a printing device when a door of the printing device has been opened. The method 100 can be performed by the printing device itself, which may be a standalone printing device or a multifunction device (MFD) or all-in-one (AIO) printing device. The printing device may be an inkjet-printing device, a laser-printing device, or another type of printing device, like a 3D-printing device. The printing device can include one colorant supply or more than one colorant supply. Each colorant supply may be a cartridge or tank, such as a toner cartridge or an inkjet cartridge or tank, which is replaced with a new cartridge to replenish the colorant supply. Each colorant supply may be a refillable internal reservoir, which is refilled with an externally supply of colorant, such as ink, to replenish the colorant supply.

The printing device can periodically determine the current status information of each colorant supply (102). The current status information can include the current supply level of each colorant supply, which is the amount of remaining colorant that the printing device can use for printing. The current status information can include the current quality level of each colorant supply. The quality of a colorant supply may degrade over time if the supply remains within the printing device and not consumed by the printing device. In the context of ink, the current quality of a colorant supply may be the current water vapor content of the ink, for instance.

The current status information of a colorant supply can include other current characteristics or attributes of the supply as well. For example, a colorant supply may be subject to manufacturer recall, based on when the last time the colorant supply was replenished or based on the replenishment colorant supply used to replenish this colorant supply. The printing device may receive this information from a server over a network to which the printing device is communicatively connected.

The printing device may determine the current status information of each colorant supply each time a print job is sent to the printing device for forming images on media, like paper, using the colorant supplies of the device. The printing device may periodically determine the current status information of each colorant supply irrespective of usage of the printing device. The printing device can determine the current status information of each colorant supply via one or more sensors that are part of the printing device itself or that are part of the colorant supplies themselves in the case of replaceable colorant supplies like cartridges.

The printing device can determine whether any colorant supply should be replenished (104). For example, the printing device may determine whether any colorant supply has a current quality level below a minimum threshold at which optimal printing quality can be assured. As another example, the current supply level of a colorant supply can be considered low if it is below a first threshold, and can be considered empty if it is below a second threshold. For instance, a colorant supply may be considered low if no more than 20% of the supply is remaining, and may be considered empty if no more than 1% of the supply is remaining. The printing device can determine whether any colorant supply is currently low or empty each time the device determines the current supply level of each colorant supply.

The printing device detects that a door of the printing device has been opened (106). The door of the printing device that the printing device detects the opening of in part 106 can be the specific door of the device that permits access to each colorant supply of the printing device. In the case in which each colorant supply is a cartridge or tank, this door is the door that is opened so that the colorant supplies can be removed from the printing device and replaced with new colorant supplies to replenish the supplies. In the case in which each colorant supply is a refillable reservoir, this door is the door that is opened to access ports through which the reservoirs are refilled to replenish the supplies. The printing device can detect that the door has been opened using a sensor.

The printing device can perform one or more of the following in response to detecting that the door has been opened (108); it is noted that the device may also perform parts 102 and 104 when the door has been opened. The printing device displays the current status information of each colorant supply on the display of the printing device (110). The printing device can display the current status information in a graphical manner, textually, or both. As an example of a graphical manner by which the printing device can display the current supply level of each colorant supply, the device can for each colorant supply display a bar having a height, length, width, or size corresponding to the current supply level of the supply in question.

The printing device can also display an indication on the display of the device as to whether any colorant supply should be replenished (112). A colorant supply should be replenished when corresponding status information of a colorant supply is below a threshold. For instance, when the current quality level of a colorant supply is below a threshold, the printing device may indicated that the colorant supply should be replenished.

The printing device may display a different indication in correspondence with the current status information in relation to multiple thresholds. As noted above, for example, the current supply level of a colorant supply may be considered low if it is below a first threshold, and considered empty if it is below a second threshold less than the first threshold. The indication denoting that a colorant supply is low may be different than the indication denoting that a colorant supply is empty. For example, the printing device may display an exclamation mark in yellow to indicate that a colorant supply is low, and may display a red letter X to indicate that a colorant supply is empty.

The printing device can display information on its display regarding a replenishment colorant supply for each colorant supply of the device (114). This information may be displayed for a colorant supply regardless of whether it is low or empty or whether it is not low or empty. The information can include a part number. For instance, in the case of a printing device that employs replaceable cartridges or tanks as colorant supplies, the printing device can display the part numbers of replacement cartridges or tanks for the cartridges or tanks currently installed in the device to replenish the colorant supplies. In the case of a printing device that employs refillable reservoirs as colorant supplies, the printing device can display the part numbers of external colorant supply cartons or containers that can be temporarily attached to the printing device refill the device's reservoirs to replenish the colorant supplies.

The printing device can display instructions on its display regarding how to replenish each colorant supply of the device (116). The instructions may be displayed graphically, textually, or both graphically and textually. For example, the printing device may display one or more images depicting how to replace or refill the device's colorant supplies to replenish the colorant supplies. The images may be static, or may be in the form of an animation. The printing device may also display text along with or instead of the images that summarize how to replenish the colorant supplies, or that explain the first steps of the replenishment process. The information displayed in parts 110, 112, 114, and 116 can be displayed at the same time on the printing device's display.

Figure 2:
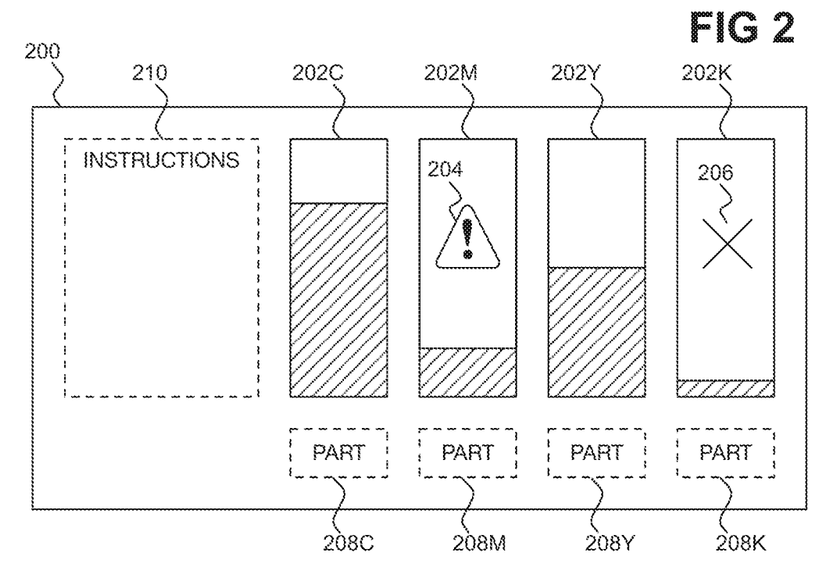
FIG. 2 is a diagram of an example display of a printing device showing the status information of each colorant supply within the device in response to opening of a door of the device.

FIG. 2 shows an example display 200 of a printing device, including the information of parts 110, 112, 114, and 116 that the printing device displays in part 108 in response to detecting that the device's door has been opened in part 106 of the method 100. In the example of FIG. 2, the printing device is a color printing device having four colorant supplies corresponding to the colors cyan, magenta, yellow, and black. The printing device specifically displays on the display 200 current supply levels 202C, 202M, 202Y, and 202K respectively corresponding to the cyan, magenta, yellow, and black colorant supplies, and which are collectively referred to as the supply levels 202. Each supply level 202 is depicted in the example of FIG. 2 as a bar having a height corresponding to the current supply level of its corresponding colorant supply.

The current supply level of a colorant supply can be specified in a number of different ways. For example, the current supply level can be specified as the volumetric amount of the remaining colorant supply, expressed in volumetric units like cubic centimeters. As another example, the current supply level may be specified as the number of pages that the remaining colorant supply can print, based on historical per-page colorant usage, based on a standard per-page colorant usage (such as that specified by the International Organization for Standardization, or ISO), and so on. As a third example, the current supply level may be specified as the length of time, in hours, days, weeks, and so on, that the remaining colorant supply is likely to last, based on historical colorant usage, such as a running average of colorant usage per unit time, for instance.

In the example of FIG. 2, the supply level 202M of the magenta colorant supply is low, and the supply level 202K of the black colorant supply is empty. The printing device can display on the display 200 an indication 204 denoting that the supply level 202M of the magenta colorant supply is low, and a different indication 206 denoting that the supply level 202K of the black colorant supply is empty. In the example of FIG. 2, the indication 204 is an exclamation mark within a triangle, and the indication 206 is the letter X. The current status information of the colorant supplies in the example of FIG. 2 includes the supply levels 202. However, as noted above, the current status information can include other information in addition to or in lieu of the supply levels 202, such as the current quality of each colorant supply.

The printing device can display on the display 200 information 208C, 208M, 208Y, and 208K respectively corresponding to the cyan, magenta, yellow, and black colorant supplies, and which are collectively referred to as the information 208. The information 208 is displayed below the supply levels 202 in the example of FIG. 2. The information 208 is information regarding compatible replenishment colorant supplies for the printing device's colorant supplies. In the example of FIG. 2, the information 208 includes part numbers for the replenishment colorant supplies. As noted above, in the case in which the printing device uses replaceable cartridges or tanks, the part numbers may be for replacement cartridges or tanks that are inserted into the printing device after the currently installed cartridges or tanks have been removed, to replenish the colorant supplies. In the case in which the printing device has refillable internal reservoirs, the part numbers may be for external colorant supplies that are temporarily fluidically connected to the device to refill the reservoirs to replenish the colorant supplies.

The printing device can display on the display 200 instructions 210 regarding how to replenish the colorant supplies of the device. As noted above, the instructions 210 can be graphical instructions (including one or more static images or an animation), textual instructions, or both graphical and textual instructions. As also noted above, the instructions 210 for a printing device that employs cartridges or tanks as the colorant supplies can pertain to replacing the cartridges or tanks to replenish the colorant supplies. The instructions 210 for a printing device that employs refillable reservoirs as the colorant supplies can pertain to refilling the reservoirs via temporary attachment of external colorant supplies to replenish the colorant supplies of the device.

Figure 3:
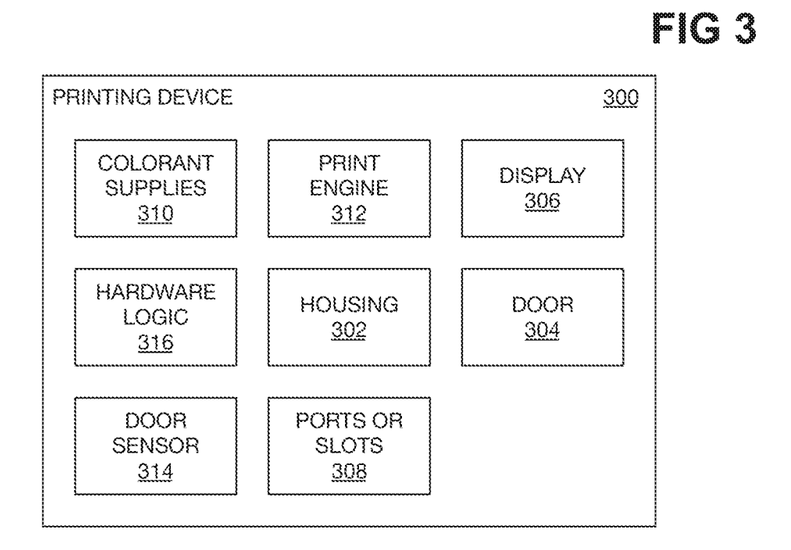
FIG. 3 is a block diagram of an example printing device.

FIG. 3 shows an example printing device 300. The printing device 300 may be a standalone printer, or an MFD or AIO device. The printing device 300 includes a housing 302, a door 304, a display 306, one or more ports or slots 308, one or more colorant supplies 310, a print engine 312, a door sensor 314, and hardware logic 316. The printing device 300 can include other components as well, in addition to or in lieu of the components depicted in FIG. 3, including current colorant supply status information sensors like supply level and colorant quality sensors, memory storing information regarding replenishment colorant supplies, and so on.

The door 304 is movably attached to the housing 302 from a closed position to an open position. The display 306 is attached to the housing 302, and can be flush with an external surface of the housing 302, or extend outwards from the housing 302. The display 306 may be a flat-panel display, such as a liquid crystal display (LCD). The display 306 may be a touchscreen so that the display 306 serves as both an input and an output mechanism of the printing device 300. If the display 306 is not a touchscreen, the printing device 300 may have a separate input mechanism, such as one or more physical controls like buttons.

The ports or slots 308 are covered by the door 304 in the closed state, and are accessible when the door 304 is moved to the open state. The colorant supplies 310 are disposed within the housing 302; opening the door 304 permits access to the colorant supplies 310. If the colorant supplies 310 are replaceable cartridges or tanks, then the ports or slots 308 can be slots into which the colorant supplies 310 are accordingly inserted. If the colorant supplies 310 are refillable internal reservoirs, then the ports or slots 308 can be ports fluidically coupled to the reservoirs through which external fluid supplies refill the reservoirs.

The print engine 312 prints using the colorant supplies 310. For example, the print engine 312 may form image on media like paper using the colorant supplies 310 if the print engine 312 is an inkjet print engine, a laser print engine. The print engine 312 may form 3D structures using the colorant supplies 310 if the print engine 312 is a 3D print engine. The door sensor 314 detects when the door 304 has been opened. The hardware logic 316 can be an application-specific integrated circuit (ASIC) encoded with program code, or a more general-purpose processor that executes program code from a memory or other storage device that is also considered part of the logic 316. In either case, the hardware logic 316 can be considered a non-transitory computer-readable data storage medium that stores program code that the printing device 300 executes. The hardware logic 316 can perform the method 100 that has been described.

Figure 4:
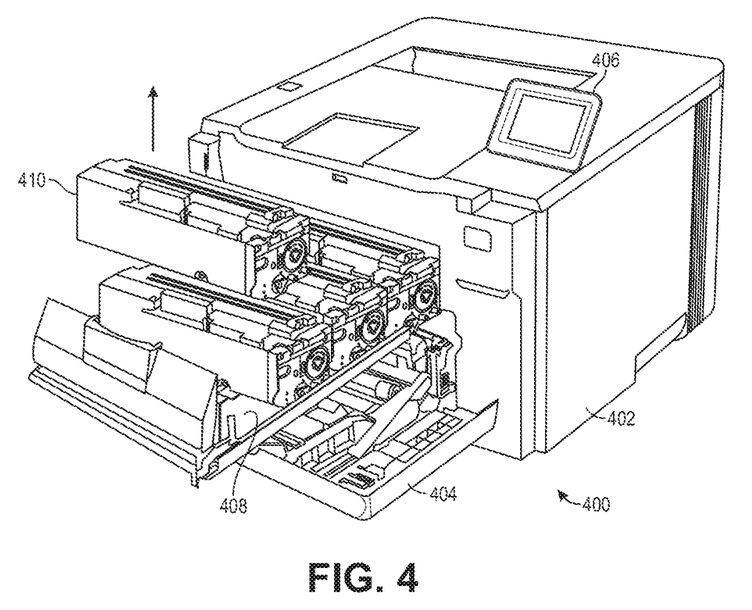
FIG. 4 is a perspective diagram of an example laser-printing device.

FIG. 4 shows an example laser-printing device 400 that is a standalone laser printer. The laser-printing device 400 includes a housing 402 to which a door 404 is movably attached. The laser-printing device 400 includes a display 406 that is attached to and specifically protrudes or extends from the housing 402 in the example of FIG. 4. The laser-printing device 400 includes slots 408 into which toner cartridges 410 are installed. The slots 408 are accessible when the door 404 is opened to permit removal of the toner cartridges 410 from the laser-printing device 400. The toner cartridges 410 are the colorant supplies of the laser-printing device 400. Opening the door 404 therefore reveals the toner cartridges 410, enabling their replacement within the laser-printing device 400 with replacement toner cartridges, to replenish the colorant supplies of the device 400.

Figure 5:
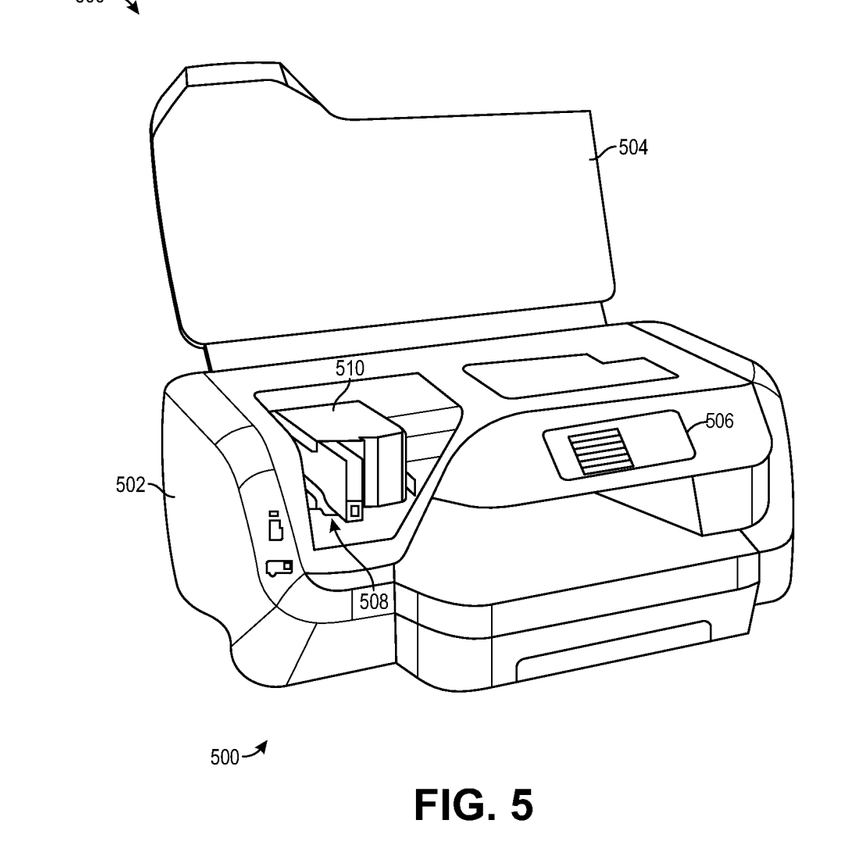
FIG. 5 is a perspective diagram of an example cartridge-based inkjet-printing device.

FIG. 5 shows an example cartridge-based inkjet-printing device 500 that is a standalone inkjet printer. The inkjet-printing device 500 includes a housing 502 to which a door 504 is movably attached. The inkjet-printing device 500 includes a display 506 that is attached to and specifically is flush with the housing 502 in the example of FIG. 5. The inkjet-printing device 500 includes slots 508 into which inkjet cartridges 510 are installed. In the example of FIG. 5, when the door 504 is opened, the inkjet-printing device 500 may move a carriage including the slots 508 leftwards so that the slots 508 are accessible to permit removal of the inkjet cartridges 510 from the device 500. The inkjet cartridges 510 are the colorant supplies of the inkjet-printing device 500. Opening the door 504 therefore reveals the inkjet cartridges 510, enabling their replacement within the inkjet-printing device 500 with replacement inkjet cartridges, to replenish the colorant supplies of the device 500.

Figure 6:
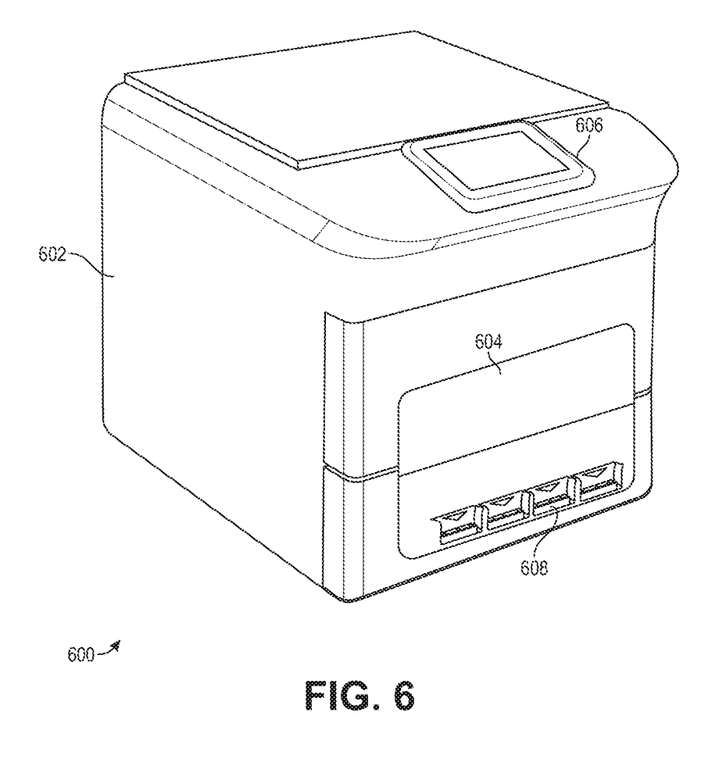
FIG. 6 is a perspective diagram of an example refillable printing device.

FIG. 6 shows an example refillable printing device 600 that is a standalone printer. For instance, the refillable printing device 600 may be a refillable inkjet-printing device. The printing device 600 includes a housing 602 to which a door 604 is movably attached. The printing device 600 includes a display 606 that is attached and specifically is flush with the housing 602 in the example of FIG. 6. The printing device 600 includes ports 608 that are fluidically connected to respective internal colorant reservoirs of the device 600. The internal reservoirs of colorant are the colorant supplies of the inkjet-printing device 600. The ports 608 are accessible when the door 604 is opened to permit refilling of the internal colorant reservoirs through the ports 608 via external colorant supplies, which may have connectors that correspondingly mate to the ports 608 to initiate reservoir refilling. Opening the door 604 therefore reveals the ports 608, enabling refilling of the internal colorant reservoirs within the inkjet-printing device 600, to replenish the colorant supplies of the device 600.

Figure 7:
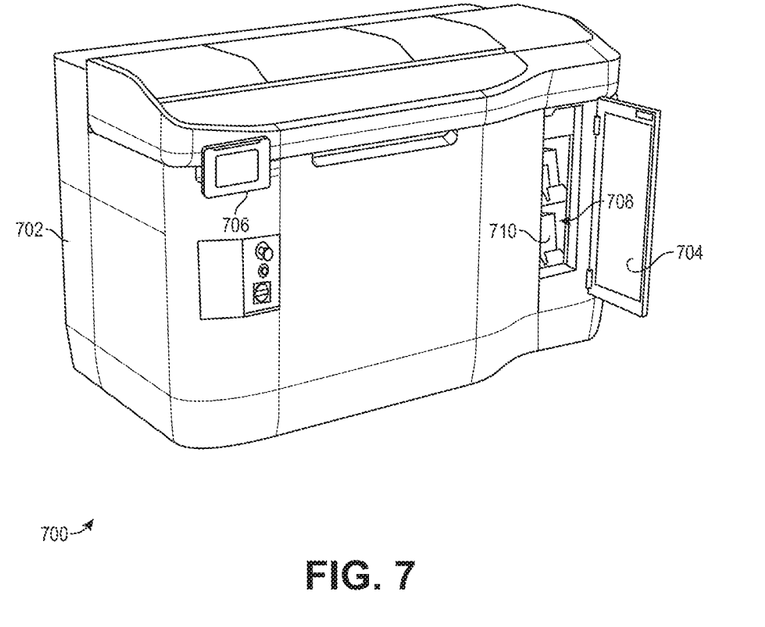
FIG. 7 is a perspective diagram of an example three-dimensional (3D) printing device.

FIG. 7 shows an example tank- or cartridge-based 3D-printing device 700 that is a standalone 3D printer. The 3D-printing device 700 includes a housing 702 to which a door 704 is movably attached. The 3D-printing device 700 includes a display 706 that is attached to the housing 702. The 3D-printing device 700 includes slots 708 in which 3D printing material tanks or cartridges 708 are installed. The slots 708 are accessible when the door 704 is opened to permit removal of the 3D printing material tanks or cartridges 710 from the 3D-printing device 700. The 3D printing material tanks or cartridges 710 are the colorant supplies of the 3D-printing device 700. Opening the door 704 therefore reveals the 3D printing material tanks or cartridges 710 within the 3D-printing device 700, enabling their replacement within the 3D-printing device 700 with replacement 3D printing material thanks or cartridges, to replenish the colorant supplies of the device 700.

Figure 8:
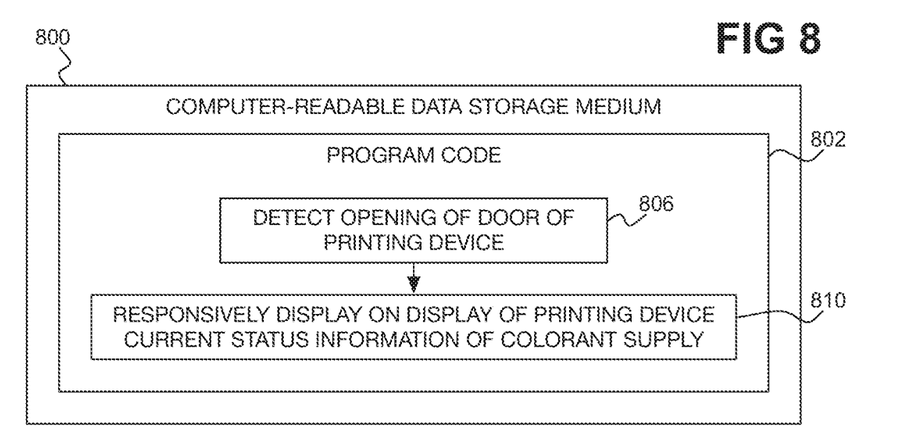
FIG. 8 is a diagram of an example non-transitory computer-readable data storage medium.

FIG. 8 shows an example non-transitory computer-readable data storage medium 800. The computer-readable data storage medium 800 stores program code 802 that a printing device executes to perform processing. The processing includes detecting that a door of the printing device has been opened (806). The processing includes, in responsive to detecting that the door of the printing device has been opened, displaying on a display of the printing device the current status information of a colorant supply within the printing device (810).

Figure 9:
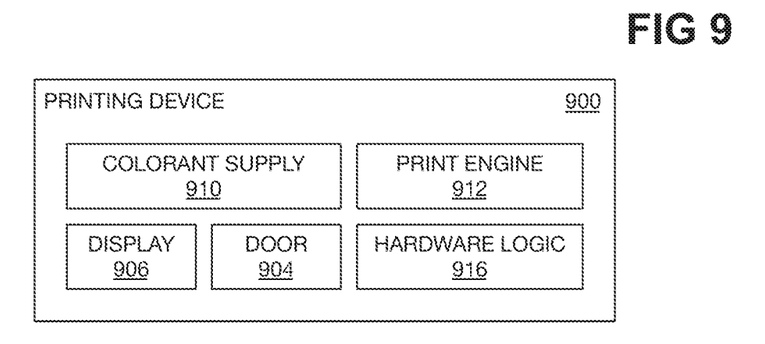
FIG. 9 is a block diagram of an example printing device.

FIG. 9 shows an example printing device 900. The printing device 900 includes a colorant supply 910, a print engine 912 to print using the colorant supply 910, and a display 906. The printing device 900 includes a door 904 permitting access to the colorant supply 910. The printing device 900 includes hardware logic 916 to, responsive to the door 904 being opened, display on the display 906 the current status information of the colorant supply 910.

Figure 10:
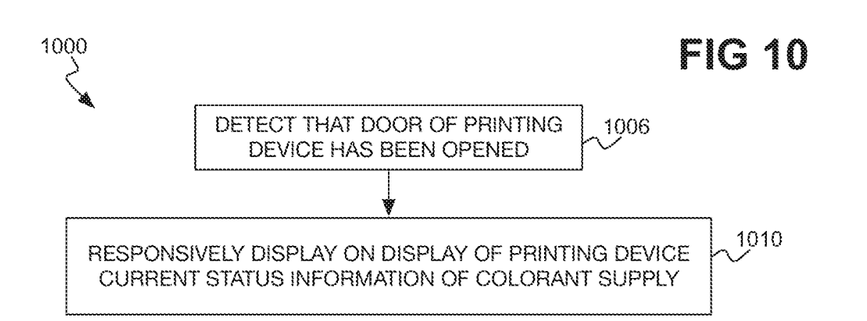
FIG. 10 is a flowchart of an example method.

FIG. 10 shows an example method 1000. The method 1000 includes detecting, by a printing device, that a door of the printing device that covers access to a colorant supply within the device has been opened (1006). The method 1000 includes, in response to detecting that the door has been opened, displaying by the printing device on a display of the device, current status information of the colorant supply (1010), such as the information displayed in part 110, part 112, part 114, and/or part 116 of the method 100 of FIG. 1.

The techniques that have been described herein make it easier for an administrator or other user to maintain a large number of diverse printing devices. When going from printing device to printing device to determine whether colorant supplies of the printing devices have to be replenished, the administrator is easily able to determine the current supply level or other current status information of each colorant supply of a printing device. Specifically, the administrator just has to open a door of a printing device for the printing device to responsively display the current supply level or other current status information of each colorant supply of the device on a display of the printing device.

We claim:

1. A non-transitory computer-readable data storage medium storing program code executable by a printing device to perform processing comprising:
    detecting that a door of the printing device that is movably attached to a housing of the printing device has been opened; and
    in response to detecting that the door of the printing device has been opened, displaying on a display of the printing device that is attached to the housing current status information of a colorant supply disposed in the housing.

2. The non-transitory computer-readable data storage medium of claim 1, wherein the processing further comprises:
    in response to detecting that the door of the printing device has been opened, displaying on the display of the printing device information regarding a replenishment colorant supply that is compatible with the printing device to replenish the colorant supply within the printing device.

3. The non-transitory computer-readable data storage medium of claim 2, wherein the replenishment colorant supply comprises an external colorant supply temporarily attachable to a port of the printing device to refill the colorant supply within the printing device.

4. The non-transitory computer-readable data storage medium of claim 2, wherein the replenishment colorant supply comprises a replacement colorant supply that replaces the colorant supply within the printing device.

5. The non-transitory computer-readable data storage medium of claim 1, wherein the processing further comprises:
    in response to detecting that the door of the printing device has been opened, displaying on the display of the printing device instructions regarding how to replenish the colorant supply within the printing device.

6. The non-transitory computer-readable data storage medium of claim 1, wherein the processing further comprises:
    detecting that the current status information of the colorant supply is below a threshold; and
    in response to detecting that the door of the printing device has been opened, displaying on the display of the printing device an indication that the colorant supply should be replenished.

7. The non-transitory computer-readable data storage medium of claim 1, wherein the door of the printing device covers a port of the printing device that is fluidically coupled to the colorant supply within the printing device,
    and wherein opening of the door of the printing device reveals the port of the printing device, enabling refilling of the colorant supply within the printing device through the port.

8. The non-transitory computer-readable data storage medium of claim 1, wherein the door of the printing device permits access to the colorant supply within the printing device,
    and wherein opening of the door of the printing device reveals the colorant supply within the printing device, enabling replacement of the colorant supply within the printing device with a replacement colorant supply.

9. A printing device comprising:
a housing;
a colorant supply disposed in the housing;
a print engine to print disposed in the housing and using the colorant supply;
a display attached to the housing;
a door movably attached to the housing and permitting access to the colorant supply; and
hardware logic disposed in the housing to, responsive to the door being opened, display on the display current status information of the colorant supply.

10. The printing device of claim 9, further comprising:
a sensor to detect opening of the door,
wherein the hardware logic is display on the display the current status information of the colorant supply responsive to the sensor detecting that the door has been opened.

11. The printing device of claim 9, further comprising:
a port that is accessible when the door is opened, and to which an external colorant supply is temporarily attachable to refill the colorant supply within the printing device.

12. The printing device of claim 9, further comprising:
a slot that is accessible when the door is opened, and in which the colorant supply is removably installed, enabling removal of the colorant supply from the printing device and insertion of a replacement colorant supply within the printing device when the door is opened.

13. The printing device of claim 9, wherein the hardware logic is further to, responsive to the door being opened, one or more of:
display information regarding a replenishment colorant supply that is compatible with the printing device to replenish the colorant supply within the printing device;
displaying instructions regarding how to replenish the colorant supply within the printing device;
displaying an indication that the colorant supply should be replenished.

14. A method comprising:
detecting, by a printing device, that a door of the printing device that is movably attached to a housing of the printing device and that covers access to a colorant supply disposed in the housing has been opened; and
in response to detecting that the door of the printing device has been opened, displaying, by the printing device on a display of the printing device that is attached to the housing, information regarding current status information of the colorant supply.

* * * * *